United States Patent [19]
Segal

[11] 3,865,662
[45] Feb. 11, 1975

[54] METHOD FOR SEALING SHELL-LIKE THERMOPLASTIC OBJECTS

[75] Inventor: Leon Segal, Morristown, N.J.

[73] Assignee: Allied Chemical Corporation, New York, N.Y.

[22] Filed: Apr. 6, 1973

[21] Appl. No.: 348,774

[52] U.S. Cl. ............... 156/94, 138/99, 156/304, 156/381, 156/431, 156/582, 264/36, 285/21
[51] Int. Cl. ............................................. B32b 35/00
[58] Field of Search ............ 156/94, 189, 304, 381, 156/429, 431, 466; 138/99; 285/21; 296/1 R; 264/36

[56] References Cited
UNITED STATES PATENTS

| | | | |
|---|---|---|---|
| 402,673 | 5/1889 | Hudson | 138/99 |
| 676,582 | 6/1901 | Aelmerich | 138/99 X |
| 2,930,634 | 3/1960 | Merritt | 285/21 |
| 3,100,658 | 8/1963 | Miller et al. | 156/304 X |
| 3,563,276 | 2/1971 | Hight et al. | 138/99 |
| 3,729,360 | 4/1973 | McElroy | 156/304 X |

FOREIGN PATENTS OR APPLICATIONS

| | | | |
|---|---|---|---|
| 766,502 | 9/1967 | Canada | 264/314 |

*Primary Examiner*—Edward G. Whitby
*Attorney, Agent, or Firm*—Roger H. Criss; Arthur J. Plantamura

[57] ABSTRACT

Thermoplastic shell-like objects are joined or repaired by supporting the area of the object to be treated, applying a preheated, reinforced thermoplastic charge and exerting pressure against the support to seal the desired area.

18 Claims, 1 Drawing Figure

METHOD FOR SEALING SHELL-LIKE THERMOPLASTIC OBJECTS

BACKGROUND OF THE INVENTION

This invention relates to a method for rapidly joining or repairing thermoplastic pipe or other shell-like objects. More particularly, the invention relates to a method for forming virtually seamless, leak-proof joints by stamping a hot shapable reinforced thermoplastic charge around the area of the desired joint, wherein the area is supported by an internal mandrel, and pressure is applied to seal the joint. The invention is also directed to a method for repairing defects in thermoplastic articles.

For the purposes of this disclosure, the term "shell-like object" includes hollow objects such as closed-wall tubular objects which are open on opposite ends and have cross sections which are circular, square, I-beam or otherwise assymetrical in shape. The general term shell-like objects is also meant to include sections of hollow objects, e.g., conduits or shipping drums, or pieces which can be visualized as being a section of a hollow object, as well as contoured or molded sheets, e.g., hemispherical shapes, automotive quarter panels and the like.

Plastic pipes possess advantages over metallic pipe in that they do not rust, scale, pit or rot, are generally non-toxic and smooth-surfaced. In addition, plastic pipe is economical, light-weight, and easy to install as well as being non-conductive and often self-insulating. These pipes as well as associated thermoplastic fittings can be made by a number of methods including casting, injection molding, extrusion or filament winding as described in U.S. Pat. Nos. 2,785,442; 2,790,997; 2,467,999 or 2,614,058 or by rapid stamping as disclosed in our copending application Ser. No. 337,235, filed Mar. 1, 1973. The pipes or fittings may be filled and/or reinforced as necessary for the specific product requirements.

One of the drawbacks for extensive use of plastic pipe has been the problem encountered in joining the pipe sections or in joining the pipes and fittings to create completely leak-proof joints. Present methods for joining include welding, using flanges and using pressure joints. More specifically, the technique of solvent welding may be used, this method employs a cement containing solvent for the plastic which dissolves a portion of the plastic and forms a tight "weld" between the two pieces. Pipes can also be joined by screwing one into the other; in this case, the external and internal ends must be threaded and it is often necessary to use cement to prevent leakage. Joints can also be made by wrapping the area with glass fabric and resin cement. This method is slow since time must be spent in carefully wrapping the joint and in waiting for the resin to cure. Moreover, this method cannot be adapted to automated production since it requires some skill or experience on the part of the operator. Thus the methds used in the prior art for joining pipes are often slow, the results are not completely leak-proof and usually result in a weaker area at the joint in relation to the rest of the pipe.

Another disadvantage to the use of plastic pipe is that when defects such as cracks or holes appear, there has heretofore been no expeditious and satisfactory way to repair the defects without weakening the surrounding area. This problem of repairing defects is also encountered in other hollow plastic containers or surfaces, bottles, receptacles, etc. Defects in large scale pressure containers, man-hole ducts, rocket casings, shipping drums, automobile bodies, etc., often cannot be repaired rapidly without subsequent strength loss and may necessitate replacement of the relatively costly, and otherwise useable item.

It is obvious then that there is a need for a method to rapidly join plastic pipes or repair defective thermoplastic surfaces and thereby produce a leak-proof seal.

SUMMARY OF THE INVENTION

In accordance with the procedure of this invention, joints for thermoplastic pipes or "shell-like" objects can easily and expeditiously be sealed, and cracks or defects repaired by placing a hot shapable reinforced thermoplastic charge containing at least 5 percent fibrous reinforcement onto or around the area to be treated. The area is supported by an internal mandrel and a seal is formed by applying pressure. The pressure may be applied by any suitable mechanism, e.g., by rollers, external mating sections, internally expanding mandrels, or by similar compression methods depending on the amount of pressure required, the size of the repair and the shape of the pipe or hollow object.

This invention has an object to provide a means for rapidly joining hollow plastic objects to produce a strong, leak-proof seal.

It is another object of the invention to provide a leak-proof method for repair of cracks or defects in hollow plastic pipes or containers.

It is also an object of the invention to provide a method for joining pipes or repairing defects which can be adapted to use in automated systems.

It is a further object to provide a means for joining or repairing shell-like objects having irregular or assymetrical cross-sections.

These and other objects and advantages will be revealed below.

DESCRIPTION OF THE PREFERRED EMBODIMENT

Figure 1:
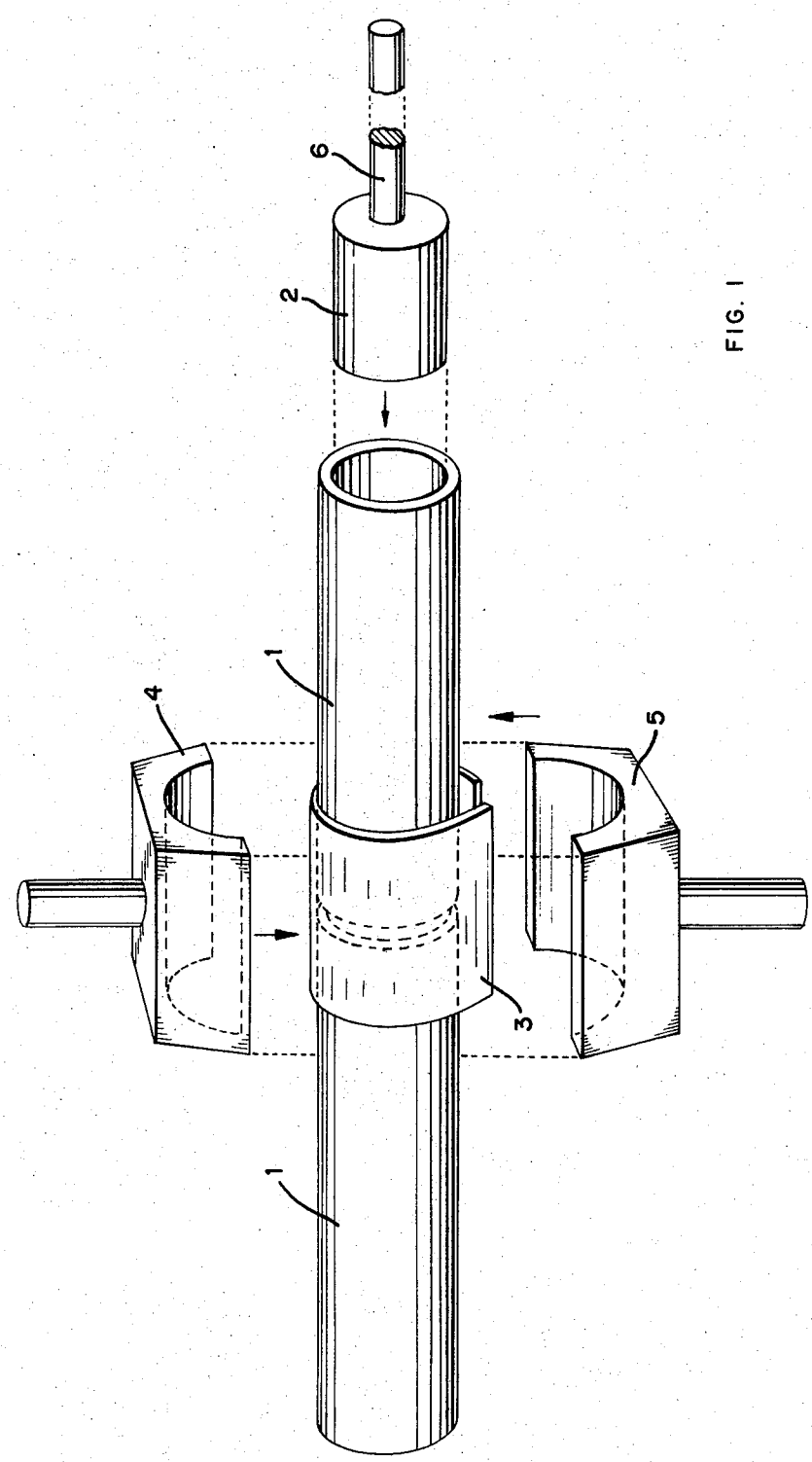
FIG. 1 illustrates the novel method of joining plastic pipe sections as disclosed herein.

The method of the present invention is described in the accompanying diagrams.

In FIG. 1 the area of the pipes 1 to be sealed is placed over a mandrel 2 which approximately conforms in shape to the area of the pipe to be joined. The pipe sections are heated slightly and a preheated reinforced thermoplastic sheet 3 of sufficient size to cover the area to be joined is draped over the pipe. Moving external matched dies 4 and 5 are then brought towards the central mandrel thereby exerting pressure upon the sheet to shape it around the pipe.

For the purpose of illustration, two external dies are shown in FIG. 1, however, it is obvious that one, two, three, four or more could be used. The dies may be brought together simultaneously, or in a step-like synchronous motion, i.e., Section 4 followed by Section 5, which gathers the two loose ends during the upperend stroke and seams them together during the forming operation. The external mating dies may be activated to exert the desired pressure by many means. Hydraulic or pneumatic rams, inflatable mold sections, mechanically activated cams or toggle clamps, or similar means may be used to move the dies and/or exert and hold the desired pressure upon the plastic material during the pipe stamping operation. After the suitable setting time has elapsed, the external dies are withdrawn from the core, and the pipe or similar section is removed. An essentially seamless, strong joint is obtained. The closing time of the external sections is usually from about ½ to 8 seconds with the total time cycle about 10–60 seconds.

Similarly, a hole or defect in a container may be repaired by supporting the defect area with an internal mandrel, placing the reinforced thermoplastic sheet over the area and applying pressure to seal. If desired, the sealed object may be primed or painted to completely cover the repaired area.

Suitable thermoplastic materials which may be employed comprise a wide range of polymeric compositions. Included, for example, are olefinic polymers such as polyethylene, polypropylene, and copolymers and terpolymers and terpolymers thereof, e.g., copolymers of ethylene and ethyl acrylate, vinyl polymers comprising one or more of the following monomers: vinyl aryls such as styrene, o-phenylstyrene, m-phenylstyrene, p-phenylstyrene, o-methylstyrene, m-methylstyrene, p-methylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene chloride, vinylidene bromide and the like; vinylesters such as vinyl acetate, vinyl propionate, vinyl butyrate, vinyl chloroacetate, vinyl benzoate, and the like; polycarbonates; cellulosics such as cellulose acetate, cellulose triacetate, cellulose acetate butyrate, cellulose propionate, ethyl cellulose and the like; polyamides such as nylon 6,6, nylon 6, nylon 6,10, poly-m-xylylene, adipamide, polyhexamethylene terephthalamide, and the like; polyesters such as polyethylene terephthalate, polyethylene isophthalate, poly(ethylene-2,7-naphthamate), polybutylene terephthalate, various copolymers thereof, and the like; chlorinated polyethylene or chlorinated polyvinyl chloride; polyfluorocarbons such as polytetrafluoroethylene, polytrifluorochloroethylene, and various copolymers and terpolymers thereof, as for example copolymers of vinylidene fluoride and trifluorochloroethylene and the like.

Other thermoplastic polymers which can be utilized include polysulfone resins, polyacetal resin, halogenated olefins, and phenoxy resins. Also included in the term thermoplastic polymers are blends of two or more polymeric materials. Illustrative of such blends are polyethylene/polypropylene, ethyleneacrylic acid-vinyl acetate terpolymers, and the like. The term also includes the metallic salts of those polymers or blends thereof, which contain free carboxylic acid groups; examples of such polymers include ethyleneacrylic polymers and ethylene-methacrylic acid polymer. Illustrative of the metals which may be used to provide the salts of such carboxylic acid polymers are the 1, 2 and 3 valent metals such as sodium, calcium and aluminum.

The swatch, sheet or charge of material used to seal the joint or make the repair should be a polymer compatible with the remainder of the section being repaired. One way to assure compatibility is to utilize as the repair material a polymer-composite identical in composition to the material being repaired (i.e., use a polypropylene repair or joining charge to seal a polypropylene object). Alternatively, other compatible materials can be used (for example, a polycaprolactam (nylon 6) swatch can be used to repair a polyhexamethylene adipamide (nylon 6,6) object or a polyethylene terephthalate swatch can be used to repair a polyethylene isophthalate charge).

In addition, the volume of the repair charge must be at least great enough to form a complete and integral seal with the section to be repaired, sealed or joined. The charge may be in the form of a sheet, an irregular swatch, a "bulk" charge, a collation of pellets or small swatches or sheets, etc. After placement and compression of the repair charge, the final structure must be unitized, relatively void-free, integral structure.

The thermoplastic composite used in the method of the present invention generally contains approximately 5 to 50 percent, preferably 10 to 45 percent fibrous reinforcements, preferably of length at least 1 inch to ensure retention of the shape of the heated sheet. The fibrous material may include glass fibers, metal fibers, carbon fibers, sapphire or aluminum whiskers, jute, hemp, sisal or thermoplastic or thermosetting fibrous materials such as nylon, rayon, polyester and the like. The reinforcements may be in the form of yarn, chopped yarn, roving, scrim, woven cloth, woven roving, nonwoven mat, chopped or continuous fiber random mat, or the like.

The thermoplastic composite sheet may also be loaded with particulate filler. Such fillers may be selected from a wide variety of minerals, metals, metal oxides, siliceous materials, metal salts, and mixtures thereof. Examples of fillers included in these categories are alumina, aluminum hydrates, feldspar, asbestos, talc, calcium carbonates, clay, carbon black, quartz, novaculite, various polymorphs of silica, kaolinite, bentonite, garnet, saponite, calcium oxide, calcium hydroxide, etc.

Additionally, the fibrous reinforcements or filler may be coated with sizing agents, coupling agents, adhesion promoters, wetting agents, and the like, as are known to those skilled in the art. Adjuvants such as thixotropic agents, lubricating agents, pigments, release agents, flame retardants, heat and light stabilizers, or similar processing aids may be added to the composition. Laminates of two or more polymeric materials, or of polymer-metal foil composites may also be utilized in this invention.

The internal mandrel may be of any dimensionally stable material that will not be adversely affected by the heat or pressures required. Thus the mandrel may be of wood, glass, metal such as stainless steel or aluminum, a thermosetting resin as phenolic resin or a thermoplastic resin as polytetrafluoroethylene. The mandrel may be either solid or hollow. For low pressure application (i.e., 100 psi or lower), a balloon or fire-hose could serve as an internally expanding mandrel.

The external dies illustrated in FIG. 1 are solely illustrative and it is obvious that the required pressure may be applied in any number of ways. Alternative pressure-exerting methods include hald-held or mechanically automated rollers, hydraulically or mechanically expanding mandrels or the like.

Also, while a pipe has been illustrated as the object sealed, various shell-like objects may similarly be sealed or repaired.

It is apparent that the shape of the internal mandrel and external sections will be dependent upon the shape of the object to be joined or repaired.

Heating channels and/or cooling channels may be provided in the external dies and/or in the core or mandrel to provide for crystallization, or cooling, of the thermoplastic polymeric materials. Heating channels may be used if the material has to crystallize to form a temperature-stable or dimensionally stable part. In semi-crystalline polymers such as polyamides, polyesters, etc. a heated die would reduce quenching and increase the degree of crystallization of the polymer.

In most cases, the mandrel is removed from the completed object by merely pulling, as with the handle 6 shown in FIG. 1. However, a major repair may require more complicated procedures. In such cases, removal may be facilitated through the use of air pressure, knock-off rings, a tapered central mandrel, mechanically expanding mandrels, pneumatically hydraulically expanding mandrels, release agents or coatings on the mandrel or in the polymer, or combinations of these features, or similar devices. A release layer, or thermoplastic, paper, metal, or similar material may also surround the mandrel. Such a layer may optionally become an integral part of the interior of the joined or repaired area to add even additional strength to this section.

The particular parameters of the object forming operation are dependent upon the type of thermoplastic polymer used. Generally, the pressure would be in the range of about 50 to 2,000 psi, depending upon the mode of pressure application; the mandrel or external mating part temperature in the range of about −20° to 200°C. and the polymer preheat temperature from above the softening temperature to below the decomposition temperature of the individual plastic. The stamping time needed for thermoplastics will vary according to thickness, viscosity, etc. but will be in the order of about 4 to 60 seconds.

The composition of the pipes to be joined or repaired also affects the molding parameters. In the case of filled and/or reinforced thermoplastics, the "set-up" time is faster than for unfilled materials. Additionally, the desired condition of the finished product will affect the forming parameters. For instance, a smooth seal or joint will require higher pressures than a rough seal.

The thermoplastic sheet may be preheated to the softening point by any one of many heating methods, i.e., infrared heating, dielectric heating, induction heating, forced-air or vacuum heating, etc., or combinations of heating methods.

Preferably, the plastic pipes are also preheated using any of the above methods to a temperature sufficient to soften the outer surface of the pipe while retaining the pipes' intrinsic shape.

The seal or joint formed using the procedure of the present invention will be leak-proof and the procedure can easily be adapted to use with automation or could be performed "in the field" rapidly and efficiently. Moreover, in many instances, the final product will be stronger in the sealed or repaired area. The overlap at the joint area will provide an approximately double thickness of piping or sealing material. Additionally, if unreinforced pipe is being sealed, the finished area will be fiber reinforced and thus stronger than the remaining portion.

The following examples further illustrate the invention.

EXAMPLE 1

A 3 inch I.D. polyethylene pipe with a 0.10 inch wall thickness and no connecting end sections was joined to a similar pipe by the following means. The two pipes were laid end-to-end (butt joined) and a cylindrical polished steel plug 8 inches long and 2.95 inches in diameter was inserted so that the center of the plug corresponded to the joint-line. A sheet of reinforced polyethylene measuring 10 × 3 × 0.10 " thick was preheated in an infrared oven until total melting was observed. This sheet of polyethylene contained 10 percent glass fibers in the form of a random mat. The sheet was transferred to the plug-supported joint area, and placed centrally over the joint. Pressure was applied by means of a hand roller, which was used to iron out the "repair" sheet. After approximately 30 seconds of applying such pressure, the steel plug was removed. The two pipe sections were now joined. Cold water was run through the joined section, and no signs of leakage were observed. The joined section was of final thickness (approx.) 0.200 and 3 inches wide (i.e., 1½ inches on either side of the joint), around the entire circumference of the pipe.

EXAMPLE 2

The procedure of Example 1 was repeated, except that the pipes to be joined were also preheated at the joint area prior to placement of the preheated swatch over the joint. The pipe ends were preheated by means of a portable, forced hot air heater, and the surface temperature was measured as 60°C. prior to placement of the near-molten reinforced swatch over the joint. Note that the reinforced swatch was handled with ease, since the reinforcing mat retained the integrity of the swatch even after melting of the polymer. After placing of the swatch and compression and cooling by means of the hand-held roller, a smooth, strong, unified pipe joint was obtained.

EXAMPLE 3

The procedure of Example 2 was repeated except that the joining swatch was reinforced with 30 percent of glass cloth. The procedure and observation were as described in Example 2.

EXAMPLE 4

The basic procedure as described in Example 2 was repeated, except that the pipe sections joined were 30 percent talc-reinforced, 3 inches I.D., 0.10 inch thick nylon 6 pipes. The repair swatch consisted of a 10 × 4 × 0.10 inches rectangle of nylon 6,6 reinforced with 30 percent by weight of 2 inches long, random glass fibers. After sealing of the pipe joint and removal of the internal mandrel or plug, a strong, unified joint was observed.

EXAMPLE 5

The procedure of Example 1 was repeated, except that in sealing the repair swatch a roller was not used. In its place, two hydraulically actuated mating dies were used to form the swatch around central core (as in FIG. 1). A pressure of approximately 600 psi per square inch of pipe surface area was delivered to the repair swatch. The result was an extremely smooth surfaced (internal and external) joint.

EXAMPLE 6

The procedure of Example 5 was repeated, except that the pipe was a 3 inch polyvinyl chloride (PVC) pipe. Also, instead of joining two sections, a 1 inch square tear (hole) was repaired by placement of the mandrel behind the tear and by placing the repairing swatch over this hole. After compression of the heated PVC swatch (reinforced with 25 percent glass cloth and filled with $CaCO_3$) for 20 seconds at a pressure of 2,000 psi, the hole was sealed. A water-tight seal was formed.

EXAMPLE 7

A rear end panel from a 1973 "Omega" model automobile as repaired using the method described herein. The end panel was formed of a 30 percent glass fiber reinforced injection molded nylon 6. The hole to be repaired measured approximately 3 inches wide and 2 inches long. A steel plate was placed behind this hole to serve as a "mandrel" or supporting section. A repair swatch of 30 percent glass mat reinforced nylon 6 was preheated in an infrared oven. The area surrounding the hole to be repaired was also preheated to assure good adhesion and the near-molten swatch was placed over the hole. A second steel plate was used as the "external mating die" and the two steel plates arranged behind the back (internal) and top (external) of the hole and swatch, with a pressure of 300 psi applied by means of a small hydraulic press. After 15 seconds, the steel plates were removed. After the repaired section had cooled to room temperature, the section was sanded and buffed to achieve a smooth surface finish. A joint line or seal line was not observable after priming and painting of this section.

EXAMPLE 8

Two pipes, similar to those used in Example 1 were joined as follows. A Teflon water hose was inserted through the two pipes and a preheated sheet of polyethylene reinforced with 25 percent nylon fibers in the form of scrim was draped over the area to be joined. Water was run through the hose, thereby expanding the hose and exerting internal pressure on the pipe. A hand roller was used to iron out the repair swatch causing the sheet to seal around the joined area.

EXAMPLE 9

A hole in a polypropylene shipping drum was repaired by placing the drum over a stainless steel cylinder, preheating a swatch of polypropylene reinforced with 20 percent glass fiber and large enough to cover the hole, draping the swatch over the area to be repaired and using a roller to smooth and seal the area thus forming a water-tight seal.

I claim:

1. A method for rapidly joining or repairing shell-like thermoplastic objects comprising the steps of:
    a. supporting the area on one side of the object to be treated;
    b. applying a preheated reinforced thermoplastic charge in the form of a sheet, swatch, bulk charge or pellets, said charge containing at least 5 percent fibrous reinforcement to the other side of the area to be treated; and
    c. exerting a stamping pressure to the preheated charge to effect a seal.

2. The method of claim 1 wherein the object to be treated is preheated prior to application of the charge.

3. The method of claim 1 wherein the thermoplastic charge contains aligned fibrous reinforcement.

4. The method of claim 1 wherein the reinforcement in the thermoplastic charge is glass fiber.

5. The method of claim 1 wherein the reinforcement in the thermoplastic charge is nylon fibers.

6. The method of claim 1 wherein the thermoplastic charge is a reinforced polyolefin.

7. The method of claim 1 wherein the thermoplastic charge is reinforced nylon 6.

8. The method of claim 1 wherein the thermoplastic charge is reinforced polyvinyl chloride.

9. The method of claim 1 wherein the thermoplastic charge is reinforced nylon 6,6.

10. The method of claim 1 wherein pressure of 50–2,000 psi is exerted to effect sealing.

11. The method of claim 1 wherein pressure is applied with external mated dies.

12. The method of claim 1 wherein pressure is applied with a hand-held roller.

13. The method of claim 1 wherein the pressures are applied by means of an internally expandable mandrel.

14. The method of claim 1 wherein the object to be treated is in the form of tubular pipe.

15. The method of claim 1 wherein the object to be treated is a hollow thermoplastic container.

16. The method of claim 1 wherein the object to be treated is a molded thermoplastic sheet.

17. The method of claim 1 wherein the object to be treated is an automotive panel.

18. The method of claim 1 wherein said thermoplastic charge comprises a sheet and said sheet is preheated to a temperature above the softening temperature to below the decomposition temperature of said thermoplastic.

* * * * *